3,295,356
SPEEDOMETER CORRECTION APPARATUS
Peter A. La Fata, 401 Lancaster Ave.,
Reading, Pa. 19602
Filed Mar. 6, 1964, Ser. No. 349,919
5 Claims. (Cl. 73—2)

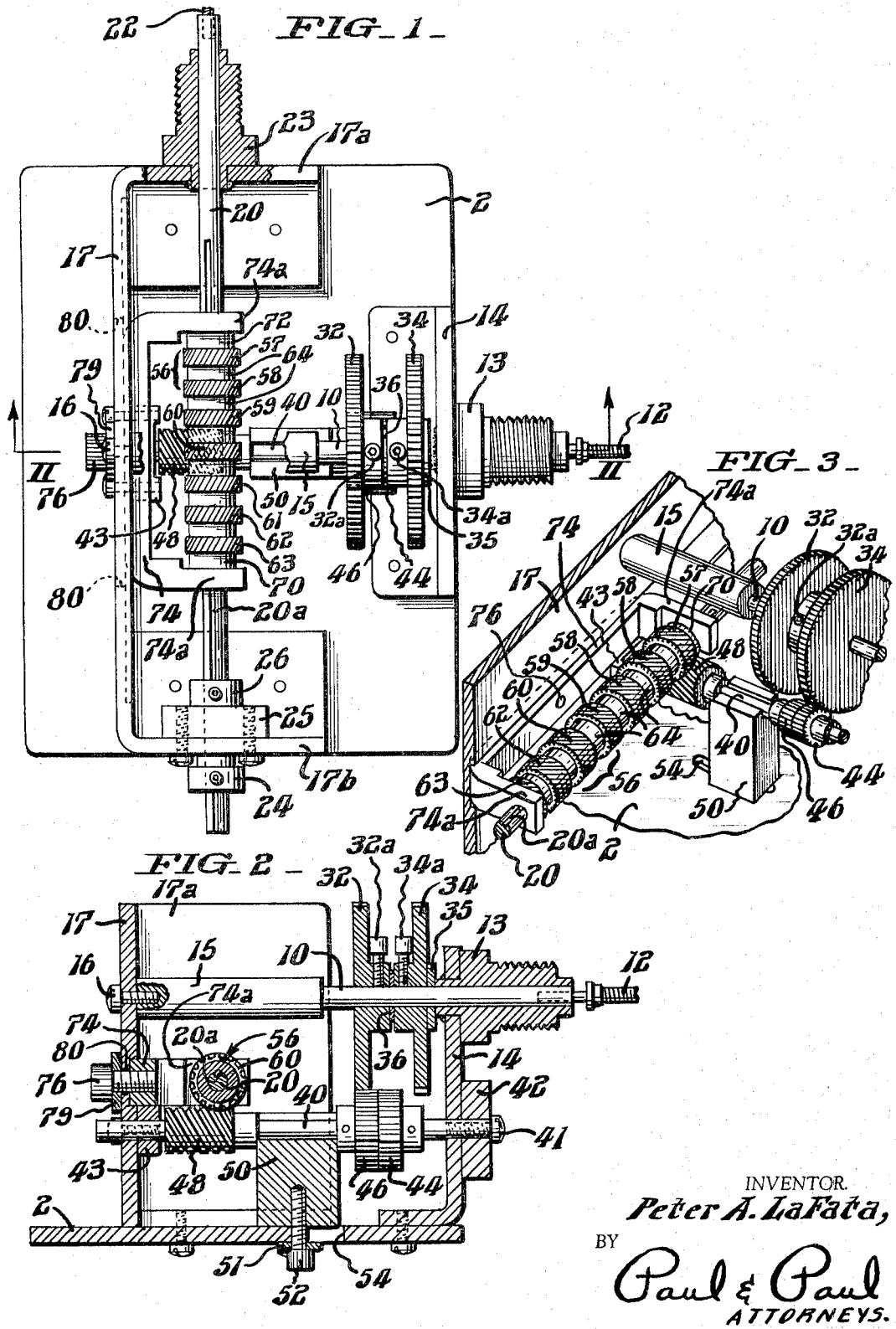

This invention relates to a speedometer correction apparatus and, more specifically, to a variable speed, positive drive correction apparatus capable of accommodating low torque loads such as found in vehicle speed or distance indicating systems.

The standard speedometer used in trucks or automobiles is geared to turn one thousand revolutions when the vehicle travels a distance of one mile. When the speedometer table turns more or less than one thousand revolutions through this distance, there exists a constant percentage error occurring within the drive train extending from the rear wheels to the speedometer. This error is reoccurring until the drive gears which form part of the speedometer system and which are usually located in the transmission box are changed. In automobiles, it is a relatively simple operation to substitute gears and make the speedometer accurate. However, in a truck, bus or other large road equipment, this is not easily done. In addition, in some vehicles an accurate reading of distance and speed travelled is often very important as, for example, when the equipment is rented or leased and payment is based upon distance travelled. An accurate speedometer is also a requisite for avoiding violations of speed limits.

Therefore, it is the primary object of this invention to provide an apparatus wherein the usual error occurring in the speedometer system of any vehicle can be easily and accurately corrected.

It is a further object of this invention to provide a positive gear drive having means for adjusting the input-output ratio under low torque loads without slippage due to a clutch arrangement.

The above described objects and other intended advantages of this invention will become more apparent from the description hereinbelow and from the attached drawings wherein:

FIGURE 1 is a plan view partly broken away showing a preferred form of the apparatus of this invention;

FIGURE 2 is a sectional view taken along the lines and arrows II—II of FIGURE 1; and FIGURE 3 is a partial perspective view of the apparatus.

A preferred embodiment of the speedometer correction apparatus of this invention as disclosed herein includes a shiftable positive gear drive arrangement for changing the input-output ratio which is inserted within the drive train extending between the rear wheels of the vehicle and the speedometer itself.

The apparatus, as shown in FIGURE 1, comprises, basically, two correction gear trains mounted on and connecting an input shaft 10, a parallel connecting shaft 40, and a transverse output shaft 20.

The input or driving shaft 10 is rotatably supported in bearing 13 mounted in vertical support member 14 at one end and held, at the distal end, in a spacer bearing 15 by screw 16 mounted in vertical support member 17. A flexible input cable 12 is connected to shaft 10 at one end and connected to the standard gearing usually located in the transmission box of a vehicle. Rotary motion, indicative of the distance travelled by the vehicle, is transferred through cable 12 to shaft 10.

A pair of spaced spur gears 32, 34 are fixedly mounted on input shaft 10 by a pair of locking screws 32a, 34a, respectively. A spacer 35 is mounted on shaft 10 between bearing 13 and the spur gear 34 and second spacer 36 is located on shaft 10 between the spur gears. Gears 32, 34 are of identical size and diameter, but gear 34 has one additional tooth than gear 32 equally spaced around its periphery.

A connecting shaft 40 mounted in spaced parallel relation with input shaft 10 is journaled for both rotary and axial movement in bearings 42, 43 attached to supports 14, 17, respectively. A second pair of spur gears 44, 46 of similar size having equal number of teeth are fixedly mounted on connecting shaft 40 and positioned on shaft 40, as shown in FIGURE 2, so that only one of the gears 44, 46 can be engaged at any time with one of the spur gears 32, 34.

Fixedly mounted at the distal end of connecting shaft 40 is a worm or helical gear 48 separated from spur gears 44, 46 by a control member 50 which is constructed to fit adjacent to shaft 40 between worm gear 48 and spur gear 46.

Control member 50 rests upon the top surface of base 2 and has a threaded bolt 52 mounted for lateral movement within transverse slot 54 formed in base 2. By loosening bolt 52 from locking washer 51, control member 50 may be moved to the right as from the position shown in FIGURES 1 and 2, thereby moving shaft 40 in that direction and causing gear 46 to disengage gear 32 and gear 44 to subsequently engage gear 34 as shown in FIGURE 3. Worm gear 48 is of such size as to continue to engage helical gear 56 mounted thereabove as explained hereinbelow when shaft 40 is moved in either direction to its limits. A limiting screw 41 is threaded in the end of shaft 40.

A transverse keyed output or driven shaft 20 is journaled for rotary movement in bearings 23, 25 mounted in supports 17a, 17b, respectively, and held against axial movement by collars 24, 26. Shaft 20 is connected to a flexible output cable 22 which is connected to a speed or distance recording instrument such as a speedometer.

Mounted on keyed shaft 20 is a cylindrical member or unitary gear 56 having a series of raised portions 57–63 positioned in spaced relation along its length which are individually cut to form separate gears of similar diameter but of different cut or number of teeth. In this embodiment, gear 57 has the greatest number of teeth and the adjacent gears have, progressively, one tooth less so that gear 63 has six fewer teeth. Member or unitary gear 56 is splined to fit within the key 20a on shaft 20 so that member 56 is free to move axially on shaft 20 but rotates with shaft 20. The raised portions or gears 57–63 on gear 56 are separated by recessed portions 64 so that when one gear of the series of gears 57–63 engages worm gear 48, the remaining gears do not engage said gear. A pair of spacers 70, 72 are mounted on shaft 20 for free rotary movement at the ends of gear 50.

A fork shaped control member 74 is mounted at its distal ends 74a on shaft 20 at opposing ends of gear 56 thereby controlling axial movement of gear 56 along shaft 20. Fork 74 slides along the interior surface of support 17 and is held thereon by a bolt 76 positioned through a transverse slot 80 in support 17. A friction washer 79 tensions bolt 76 so that the shifting fork 74 may be positioned and then locked in any location along slot 80.

In this form of the invention, rotary motion is transferred from the transmission or other source through cable 12 to input shaft 10 and hence to spur gears 32, 34 mounted thereon. As one of the gears 32, 34 engages one of the pair of identical gears 44, 46 mounted on shaft 40, said shaft is rotated at a constant speed at a greater r.p.m. because of the relative size of the pairs of gears 32, 34 and 44, 46. Worm gear 48 mounted on shaft 40 at the distal end engages one of the seven helical gears 57–63 comprising the unitary gear structure 56 causing shaft 20 to rotate at a higher r.p.m. than shaft 40. Subsequently, rotary motion is transferred from shaft 20 to the flexible output cable 22.

In the embodiment disclosed herein, spur gear 34 is equipped with eighty equally spaced teeth while gear 32 has only 79 teeth. When gears 44, 46 have 17 teeth, a gear reduction ratio of approximately 4:1 is achieved when gear 34 is engaged by gear 44. The number of teeth on worm gear 48 and center helical gear 60 are such that an increase in shaft revolutions in the ratio of 4:1 is achieved. Therefore, when gear 34 engages gear 44 and gear 48 engages gear 60, the ratio of revolutions between shafts 10 and 20 is 1:1. When gear 32 mounted on shaft having only 79 teeth is meshed with gear 46, revolutions of shaft 40 is decreased by 2½%. When the gear 56 is shifted so that worm gear 48 engages helical gear 61, an increase of 5% is made in the number of revolutions of shaft 20. Similarly, opposite movement of gear 56 so that gear 59 engages worm gear 48 causes a reduction of 5% in output shaft revolutions. The size and cut of gears 57–63 is such that there is a progressive reduction of shaft revolutions in increments of 5% moving from center gear 60 through gears 59, 58 and 57 and, correspondingly, there is a progressive increase in shaft revolutions in increments of 5% moving from center gear 60 through gears 61, 62 and 63.

The built-in error in the uncorrected speedometer system is determined by counting the revolutions of the input shaft over a distance of one mile. When it is found that the number of revolutions are substantially different than 1000, control fork 74 is moved so that the appropriate gear in gear member 56 is engaged with worm gear 48. If the error is plus, then gears 57–59 are used to decrease the output by 5% for each gear. If the error is minus, then gears 61–63 are used to increase the output by 5% for each gear. When the error is determined as being less than 5%, correction of 2½% is made by changing gears 32, 34 by control member 50.

Although the apparatus of this invention has been described as finding particular advantageous use as a speedometer correction device, it should be understood that the apparatus can be adapted to a variety of other situations, particularly where relatively low torque motion is corrected. The advantage of this apparatus stems from its capacity to correct a wide variety of shaft inaccuracies or shaft speeds by a direct drive engagement rather than through a slippage system. The apparatus of this invention may find utilization in fuel feeding control mechanism wherein it is desirable to vary the rate of flow. Associated with a rocket motor and radio responsive drive means for controlling the movement of shifting fork 74 and control 50, this apparatus can change at will the output shaft revolutions relative to a constant input.

The apparatus of this invention may be formed from a variety of materials according to its proposed utilization. In those instances where weight is a critical factor, the gears, shifting control means, and supporting bearings should be composed of a light weight plastic without subtracting from the potential of the device.

Certain alterations and improvements in the embodiment of the invention disclosed herein are possible. For example, in place of unitary member 56, a series of individual gears could be splined on shaft 20. Similarly, the input could be connected to shaft 20 and the take-off made from shaft 10.

Although this invention has been disclosed with reference to specific forms and embodiments thereof, it will be appreciated that a great number of variations may be made without departing from the spirit or scope of this invention. For example, parts may be reversed, equivalent elements may be substituted for those specifically disclosed, and certain features of the invention may be used independently of other features, all without departing from the spirit and scope of this invention as defined in the appended claims.

Having described my invention, I claim:

1. A speedometer correction apparatus associated with a source of rotary movement and rotary movement indicating means, said apparatus comprising:
   a shaft connected to a source of rotary movement for movement therewith,
   a shaft connected to the rotary movement indicating means for driving said means,
   positive gear drive means connecting said shafts comprising
      a helical gear fixedly mounted on one shaft,
      a series of helical gears having the same diameter but different number of teeth mounted adjacent each other on the second shaft so that the single helical gear engages one of the helical gears mounted on the second shaft at any time, and
      means for controllably displacing the series of helical gears axially on the second shaft so that any one of the series of helical gears may be placed into engagement with the single helical gear whereby a different ratio of rotation between the two shafts is affected.

2. The apparatus as defined in claim 1 wherein the series of helical gears are splined to the second shaft.

3. The apparatus as defined in claim 1 wherein means for displacing the series of helical gears comprises a fork shaped control member having distal ends mounted on the second shaft adjacent each end of the series of helical gears, whereby the gears may be displaced axially along the shaft.

4. A variable speed positive gear drive for low torque loads, comprising:
   a driving shaft,
   a driven shaft,
   an independent helical gear fixedly mounted on one shaft,
   a series of helical gears mounted adjacent each other on the other shaft, said series of gears splined to the shaft and having the same outside diameter but different number of equally spaced teeth,
   means for controllably displacing the series of helical gears axially on the second shaft so that any one of the series of said gears may be placed into engagement with the independent helical gear to change the ratio of rotation between the driving and driven shafts.

5. A speedometer correction apparatus having direct gear means for varying the ratio of input-output shaft revolutions, said apparatus comprising,
   a series of gears mounted on a first shaft for being shifted as a unit axially thereof and for rotating therewith, said gears being the same in diameter and, from gear to gear, progressively different in number of teeth, said teeth being circumferentially equally spaced,
   an independent gear mounted on a second shaft positioned to engage one of the gears mounted on the first shaft, and
   means for shifting the series of gears relative to the independent gear including a control member adjustably fixed in position and operatively engaged with the series of gears, the member being operable for shifting the series of gears axially of the first shaft whereby any selected gear of the series thereof may be placed in engagement with the independent gear.

References Cited by the Examiner

UNITED STATES PATENTS

| | | | |
|---|---|---|---|
| 1,527,247 | 2/1925 | Bouillon | 74—344 |
| 2,914,958 | 12/1958 | De Changy | 74—344 |

FOREIGN PATENTS

| | | |
|---|---|---|
| 96,651 | 8/1960 | Norway. |

LOUIS R. PRINCE, *Primary Examiner.*

DAVID SCHONBERG, *Examiner.*

S. C. SWISHER, *Assistant Examiner.*